(12) United States Patent
Yamada

(10) Patent No.: US 11,174,975 B2
(45) Date of Patent: Nov. 16, 2021

(54) PIPE ERRONEOUS ASSEMBLY PREVENTING STRUCTURE

(71) Applicant: HONDA MOTOR CO., LTD., Tokyo (JP)

(72) Inventor: Satoshi Yamada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 16/366,606

(22) Filed: Mar. 27, 2019

(65) Prior Publication Data
US 2019/0301654 A1    Oct. 3, 2019

(30) Foreign Application Priority Data
Mar. 28, 2018   (JP) .............................. JP2018-062558

(51) Int. Cl.
*F16L 55/00* (2006.01)
*F16L 37/00* (2006.01)
*F16L 41/08* (2006.01)

(52) U.S. Cl.
CPC ............. *F16L 55/00* (2013.01); *F16L 37/008* (2013.01); *F16L 41/08* (2013.01); *F16L 2201/10* (2013.01)

(58) Field of Classification Search
CPC ..... F16L 2201/10; F16L 55/00; F16L 37/008; F16L 41/08; F16L 5/00; F16D 1/116; Y10T 403/1616; Y10T 403/1624
See application file for complete search history.

(56) References Cited

U.S. PATENT DOCUMENTS

| 1,354,359 A | * | 9/1920 | Wartchow | ............... F16L 41/08 |
| | | | | 137/317 |
| 4,753,458 A | * | 6/1988 | Case | ................... F16L 37/0987 |
| | | | | 285/319 |

(Continued)

FOREIGN PATENT DOCUMENTS

| CN | 1398335 A | 2/2003 |
| CN | 202326564 U | 7/2012 |

(Continued)

OTHER PUBLICATIONS

Dec. 17, 2019, Japanese Office Action issued for related JP Application No. 2018-062558.

(Continued)

*Primary Examiner* — David Bochna
*Assistant Examiner* — James A Linford
(74) *Attorney, Agent, or Firm* — Paratus Law Group, PLLC

(57) ABSTRACT

A pipe erroneous assembly preventing structure includes a pipe and a case. The pipe includes a stay in which a stay-side abutting portion and a stay claw portion intersect with each other in an L shape. The case includes a hole forming portion; a first protrusion portion provided in the hole forming portion; a case-side abutting portion which is recessed in the first protrusion portion and to which the stay-side abutting portion of the stay abuts, and a second protrusion portion protruding from the case wall surface. In a case where a length of the stay claw portion in the insertion direction is set to Ls, a distance from the case wall surface to the case-side abutting portion is set to Lg, and a distance from the case wall surface to the second protrusion portion is set to Lp, Lg−Lp<Ls≤Lg is satisfied.

3 Claims, 17 Drawing Sheets

(56) References Cited

U.S. PATENT DOCUMENTS

| | | |
|---|---|---|
| 5,634,673 A | 6/1997 | Miyazaki et al. |
| 5,765,877 A | 6/1998 | Sakane et al. |
| 2003/0042372 A1 | 3/2003 | Chou |
| 2004/0083884 A1 | 5/2004 | Faller |
| 2006/0022454 A1* | 2/2006 | Le Clinche .......... F16L 13/148 285/93 |
| 2014/0117664 A1 | 5/2014 | Ekström |
| 2017/0284583 A1 | 10/2017 | Eckard et al. |
| 2017/0373547 A1 | 12/2017 | Fujihira et al. |

FOREIGN PATENT DOCUMENTS

| | | |
|---|---|---|
| CN | 103649612 A | 3/2014 |
| CN | 107289216 A | 10/2017 |
| JP | S56-031955 U | 3/1981 |
| JP | H08-200578 A | 8/1996 |
| JP | 2003-074752 A | 3/2003 |
| JP | 2012-105500 A | 5/2012 |
| WO | WO 01/35015 A1 | 5/2001 |

OTHER PUBLICATIONS

Jul. 3, 2020, Chinese Office Action issued for related CN application No. 201910240448.3.
Aug. 1, 2019, European Search Report issued for related EP Application No. 19165474.8.

* cited by examiner

PIPE ERRONEOUS ASSEMBLY PREVENTING STRUCTURE

CROSS-REFERENCE TO RELATED APPLICATIONS

This application is based on and claims priority under 35 USC 119 from Japanese Patent Application No. 2018-062558 filed on Mar. 28, 2018, the contents of which are incorporated herein by reference.

TECHNICAL FIELD

The present invention relates to a pipe erroneous assembly preventing structure applicable to a cooling pipe or the like for cooling an electric rotary machine.

BACKGROUND ART

In a cooling pipe for cooling an electric rotary machine, in order to supply a coolant discharged from a discharge hole provided in the cooling pipe to a desired position, it is necessary to fix the cooling pipe correctly to a case of the electric rotary machine.

In addition, two cooling pipes or more are fixed in the case sometimes, and even in that case, it is necessary to assemble a predetermined pipe to a predetermined position without misassembling two or more cooling pipes.

For example, in Japanese Patent Application Laid-Open Publication No. H08-200578, an erroneous assembly preventing structure is provided in a stopper for preventing disengagement between ends of pipes connected to each other.

However, the erroneous assembly preventing structure described in Japanese Patent Application Laid-Open Publication No. H08-200578 can only be applied to a connecting portion between the pipes which the stopper is used therefor, and cannot be adopted as an erroneous assembly preventing structure for fixing a pipe to a case.

The present invention is to provide a pipe erroneous assembly preventing structure capable of preventing erroneous assembly between a case and a pipe.

SUMMARY

A pipe erroneous assembly preventing structure related to the present invention includes: a pipe; and a case provided with a pipe insertion hole into which the pipe is inserted on a case wall surface thereof. The pipe is provided with a stay in which a stay-side abutting portion extending in a direction orthogonal to an axial center of the pipe and a stay claw portion extending from the stay-side abutting portion along an insertion direction intersect with each other in an L shape. The case is provided with: a hole forming portion surrounding a peripheral of the pipe insertion hole; a first protrusion portion provided in the hole forming portion; a case-side abutting portion which is recessed in the first protrusion portion and to which the stay-side abutting portion of the stay abuts; and a second protrusion portion protruding from the case wall surface and provided on an outside of the hole forming portion at a position different from the case-side abutting portion in a circumferential direction. In a case where a length of the stay claw portion in the insertion direction is set to Ls, a distance from the case wall surface to the case-side abutting portion is set to Lg, and a distance from the case wall surface to the second protrusion portion is set to Lp, Lg−Lp<Ls≤Lg is satisfied.

According to the invention, since Ls≤Lg is established, when the pipe is correctly inserted into the pipe insertion hole of the case, the stay-side abutting portion abuts to the case-side abutting portion without the tip end of the stay claw portion interfering with the case wall surface. On the other hand, when the phases of the stay-side abutting portion and the case-side abutting portion deviate from each other, since the stay-side abutting portion interferes with the first protrusion portion of the case, it is possible to detect the erroneous insertion. When the stay-side abutting portion greatly deviates from the case-side abutting portion in phase such that the stay-side abutting portion does not interfere with the first protrusion portion, since the tip end of the stay claw portion interferes with the second protrusion portion, which is provided on the outside of the hole forming portion to satisfy Lg−Lp<Ls, it is possible to detect the erroneous insertion, and it is possible to properly prevent the erroneous assembly between the case and the pipe.

DETAILED DESCRIPTION

Hereinafter, embodiments of a pipe erroneous assembly preventing structure according to the invention will be described with reference to the accompanying drawings.

First Embodiment

A pipe erroneous assembly preventing structure 1 according to a first embodiment includes a pipe 10 and a case 20.

Figure 1:
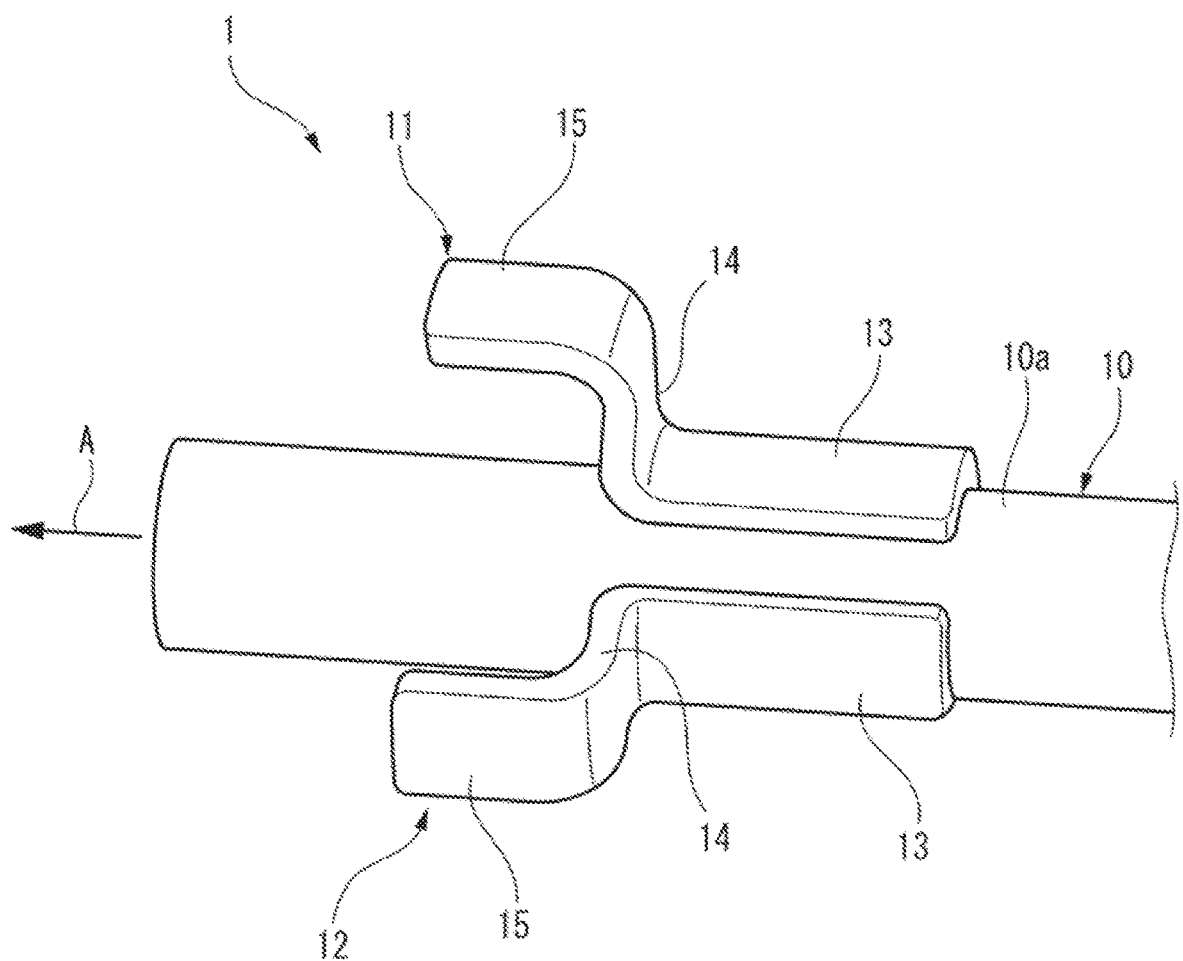
FIG. 1 is a perspective view illustrating a pipe in a pipe erroneous assembly preventing structure according to a first embodiment.
Figure 2:
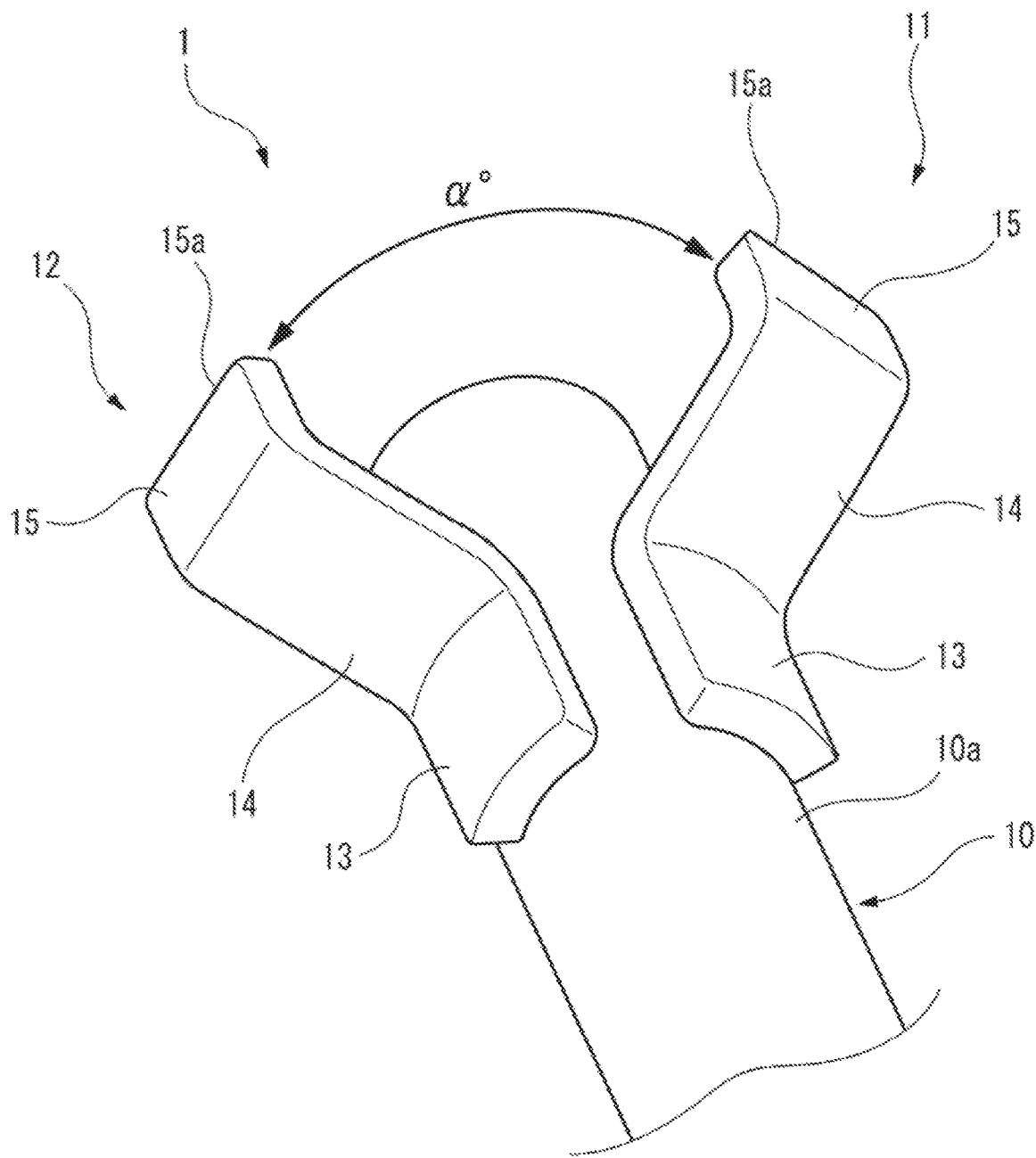
FIG. 2 is a perspective view illustrating a main portion of the pipe illustrated in FIG. 1.

As illustrated in FIGS. 1 and 2, the pipe 10 is provided at the tip end portion thereof with a first stay 11 and a second stay 12 which have the same shape and the same dimension. The angle between the first stay 11 and the second stay 12 is α° (for example, 90°).

The first stay 11 and the second stay 12 include a base 13, a stay-side abutting portion 14, and a stay claw portion 15, respectively. The base 13 is fixed to the outer circumferential surface 10a of the pipe 10 through welding or the like. The stay-side abutting portion 14 extends from the base 13 to a direction orthogonal to the axial center of the pipe 10. The stay claw portion 15 extends from the stay-side abutting portion 14 along an insertion direction (a direction of an arrow A) which is an extension direction of the pipe 10. The stay-side abutting portion 14 and the stay claw portion 15 intersect with each other in an L shape.

Figure 3:
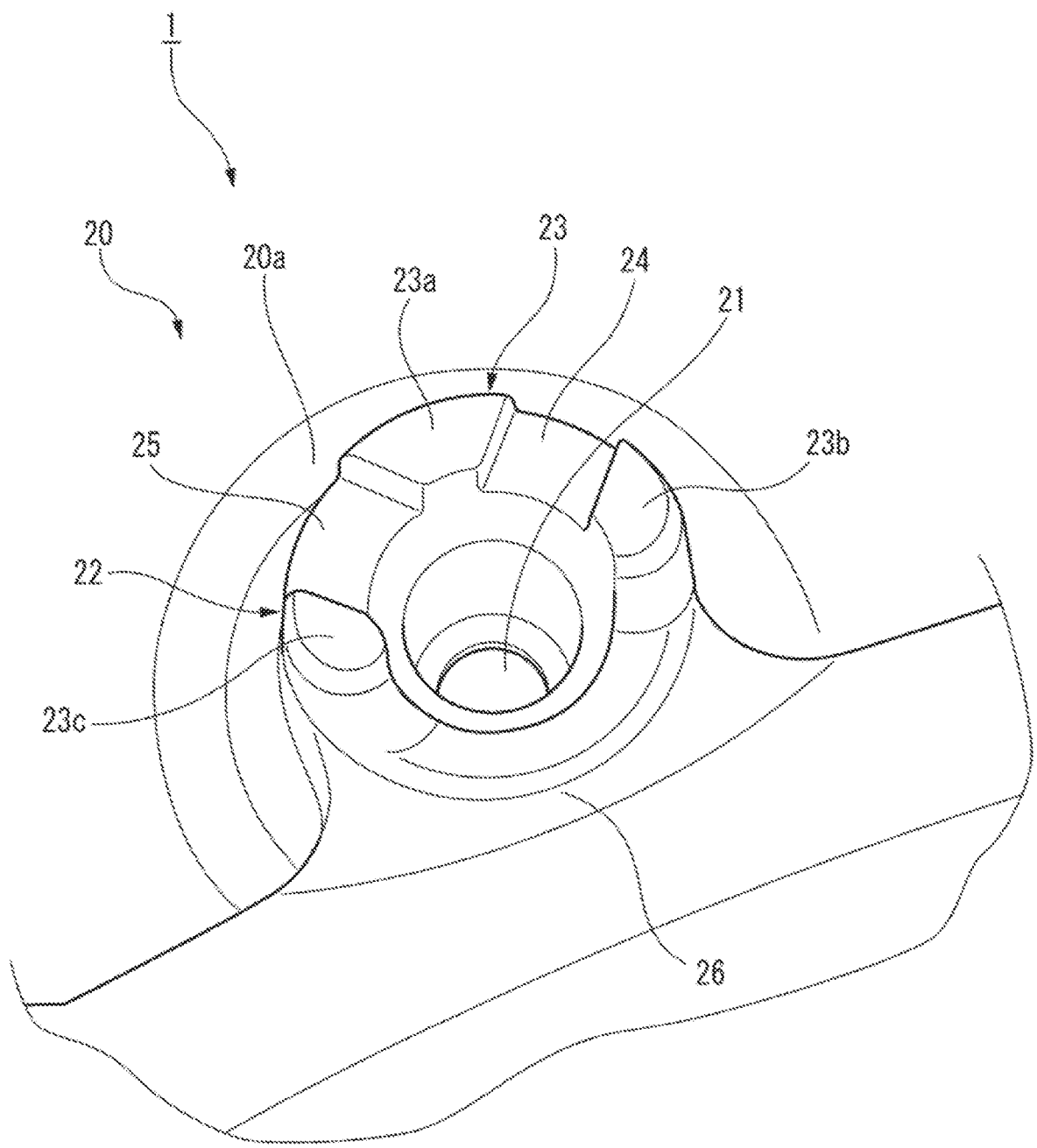
FIG. 3 is a perspective view illustrating a main portion of a case in the pipe erroneous assembly preventing structure of the first embodiment.

As illustrated in FIG. 3, the case 20 is provided with a pipe insertion hole 21 into which the pipe 10 is inserted and a boss portion 22 surrounding the peripheral of the pipe insertion hole 21. In other words, in the case 20, the pipe insertion hole 21 is provided in the boss portion 22.

The boss portion 22 is an annular protrusion portion protruding from a case wall surface 20a. The boss portion 22 is provided with a first protrusion portion 23, and a first case-side abutting portion 24 and a second case-side abutting portion 25 which are recessed in the first protrusion portion 23. The first protrusion portion 23 further protrudes from the boss portion 22, and the first case-side abutting portion 24 and the second case-side abutting portion 25 are recessed in the first protrusion portion 23. The angle between the first case-side abutting portion 24 and the second case-side abutting portion 25 is 90°. Since the first case-side abutting portion 24 and the second case-side abutting portion 25 are provided, the first protrusion portion 23 is divided into three protrusion parts 23a to 23c.

More specifically, in the boss portion 22, the first case-side abutting portion 24 is provided between the protrusion part 23a and the protrusion part 23b, and the second case-side abutting portion 25 is provided between the protrusion part 23a and the protrusion part 23c. The first case-side abutting portion 24 is a portion to which the stay-side abutting portion 14 of the first stay 11 abuts, and the second case-side abutting portion 25 is a portion to which the stay-side abutting portion 14 of the second stay 12 abuts.

A second protrusion portion 26 is provided in the vicinity of the boss portion 22. The second protrusion portion 26 protrudes from the case wall surface 20a. The second protrusion portion 26 is provided at a position different from those of the first case-side abutting portion 24 and the second case-side abutting portion 25 in a circumferential direction of the pipe insertion hole 21. In this embodiment, the second protrusion portion 26 is provided to surround the boss portion 22 on the opposite side to the first protrusion portion 23 with the pipe insertion hole 21 interposed therebetween.

In the first embodiment, in the pipe 10 and the case 20 configured as described above, the length of the stay claw portion 15 in the insertion direction (the direction of the arrow A) is set to Ls, the distance from the case wall surface 20a to the first case-side abutting portion 24 and the second case-side abutting portion 25 is set to Lg, and the distance from the case wall surface 20a to the second protrusion portion 26 is set to Lp. In this state, the dimension of each part is selected to satisfy Lg−Lp<Ls≤Lg. Lg−Lp may have a zero or negative value (0 or less).

Figure 4A:
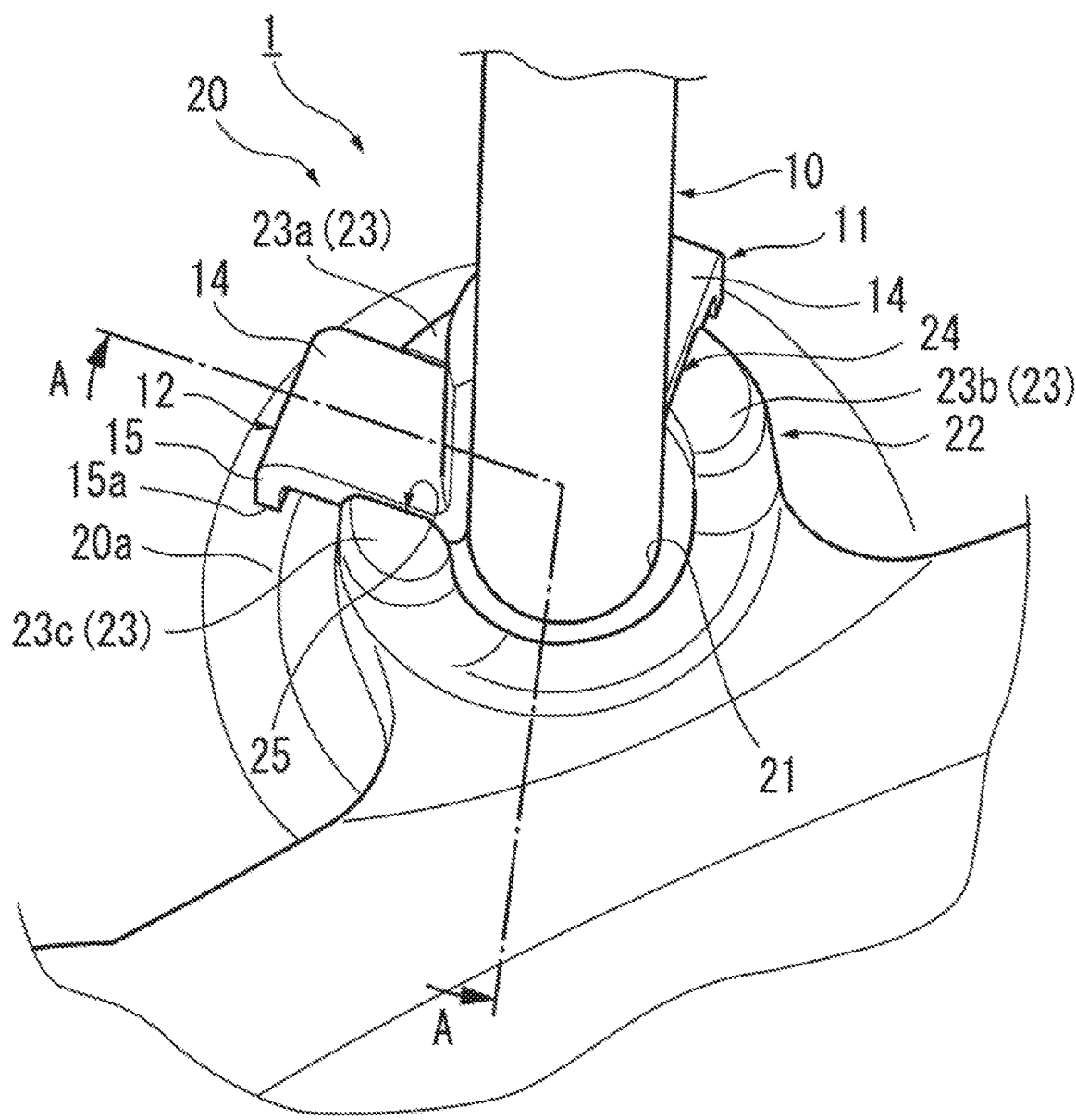
FIG. 4A is a perspective view illustrating a main portion in a state where the pipe is correctly inserted in the pipe erroneous assembly preventing structure of the first embodiment.
Figure 4B:
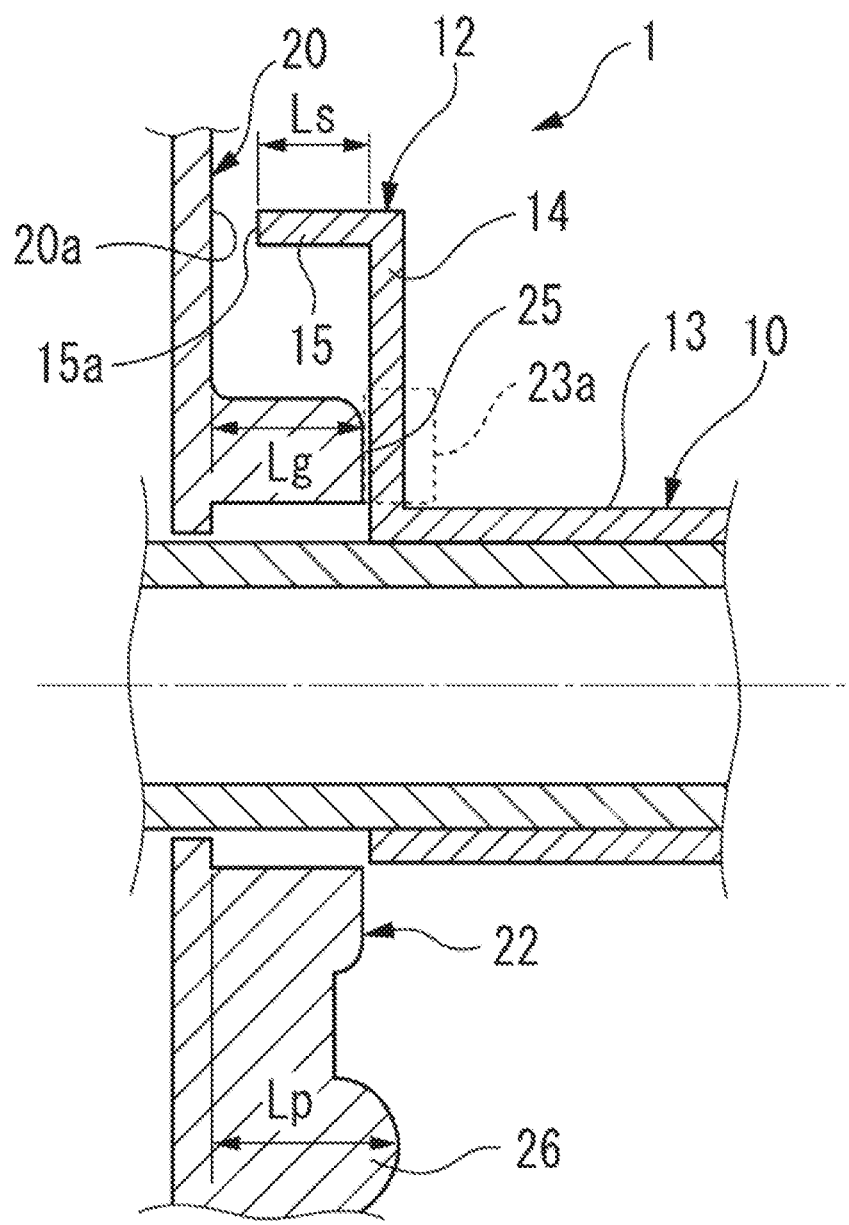
FIG. 4B is a cross sectional view taken along line A-A of FIG. 4A.

According to the first embodiment, as illustrated in FIGS. 4A and 4B, when the pipe 10 is correctly inserted into the pipe insertion hole 21 of the case 20, Ls≤Lg is established. Therefore, since a tip end 15a of the stay claw portion 15 of each of the first stay 11 and the second stay 12 does not interfere with the case wall surface 20a, the stay-side abutting portion 14 of each of the first stay 11 and the second stay 12 abuts to the first case-side abutting portion 24 and the second case-side abutting portion 25 each. Accordingly, the pipe 10 is correctly assembled to the case 20.

Figure 5:
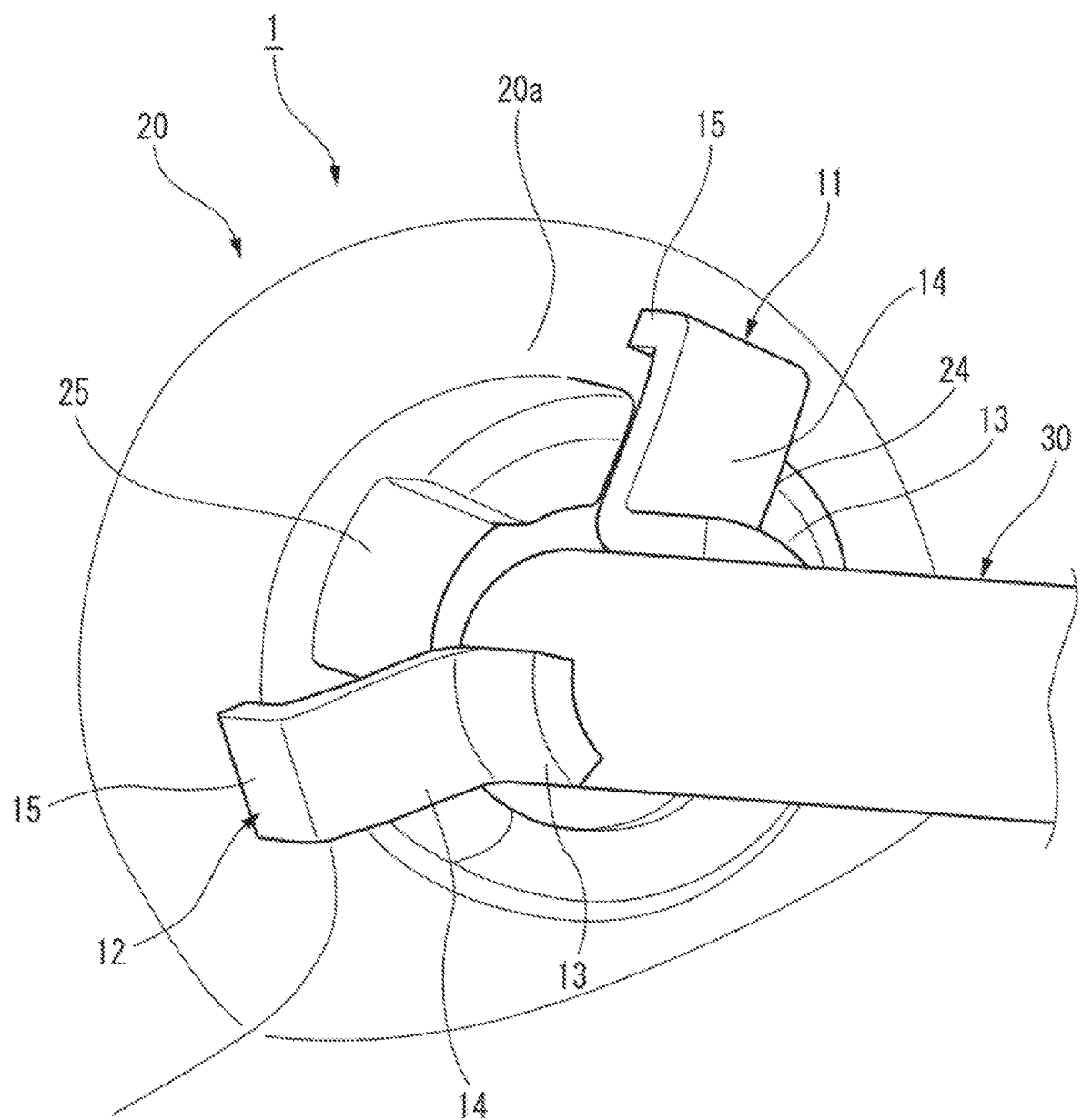
FIG. 5 is a perspective view illustrating a main portion of the pipe erroneous assembly preventing structure of the first embodiment in a state of being erroneously assembled with another pipe.

On the other hand, as illustrated in FIG. 5, in a case where a pipe (for example, a pipe 30 of a second embodiment) in which the angle between the first stay 11 and the second stay 12 is different from that of the pipe 10 in the first embodiment is inserted into the pipe insertion hole 21, that is, when the stay-side abutting portions 14 of the first stay 11 and the second stay 12 deviate from the first case-side abutting portion 24 and the second case-side abutting portion 25 in phase, since the stay-side abutting portions 14 interfere with the protrusion part 23b and the protrusion part 23c of the case 20, the pipe 30 cannot be inserted until reaching the correct position and it is possible to detect the erroneous insertion.

Figure 6A:
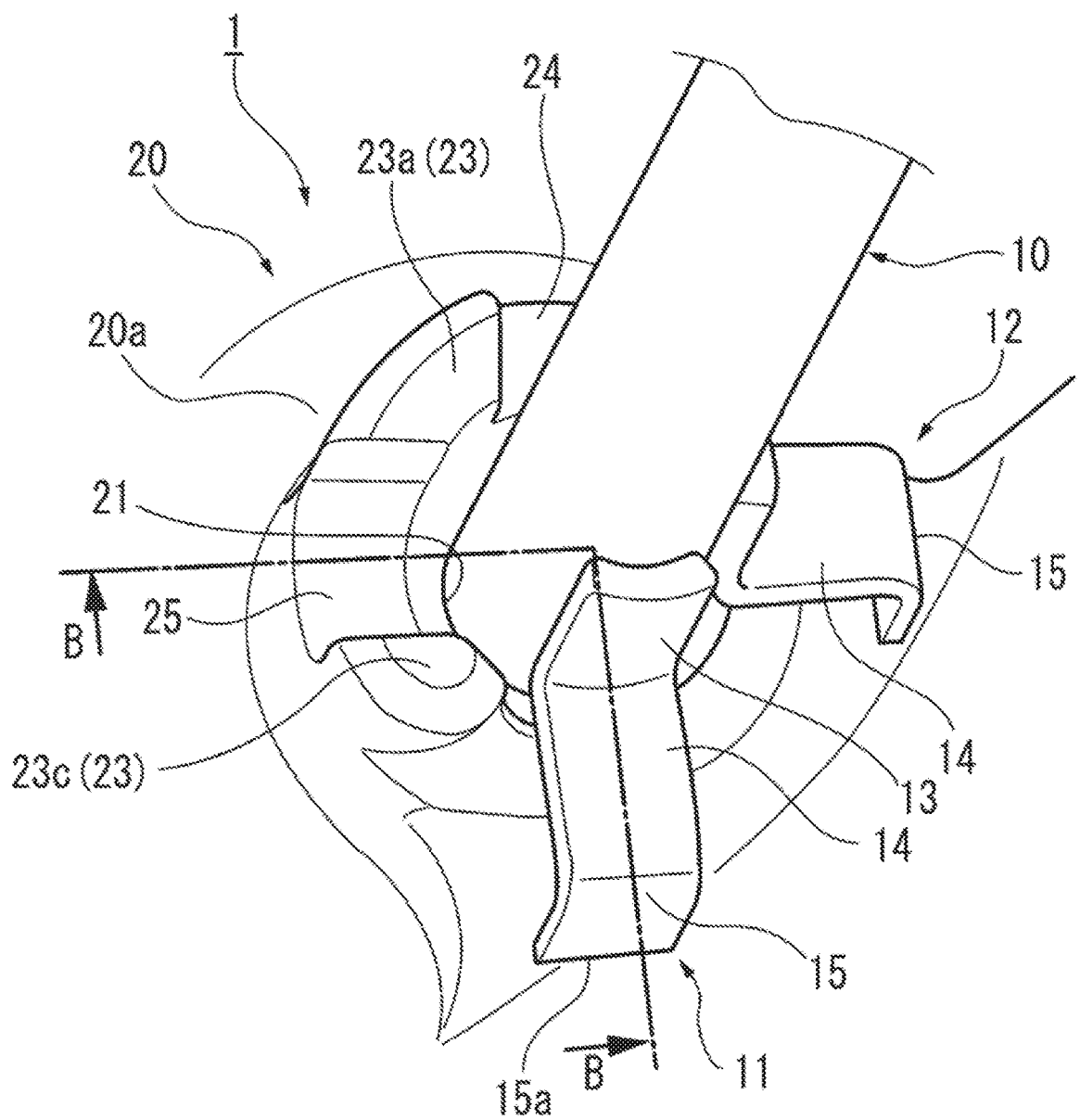
FIG. 6A is a perspective view illustrating a main portion of the pipe erroneous assembly preventing structure of the first embodiment in a state where the pipe is erroneously assembled thereto with a wrong angle.
Figure 6B:
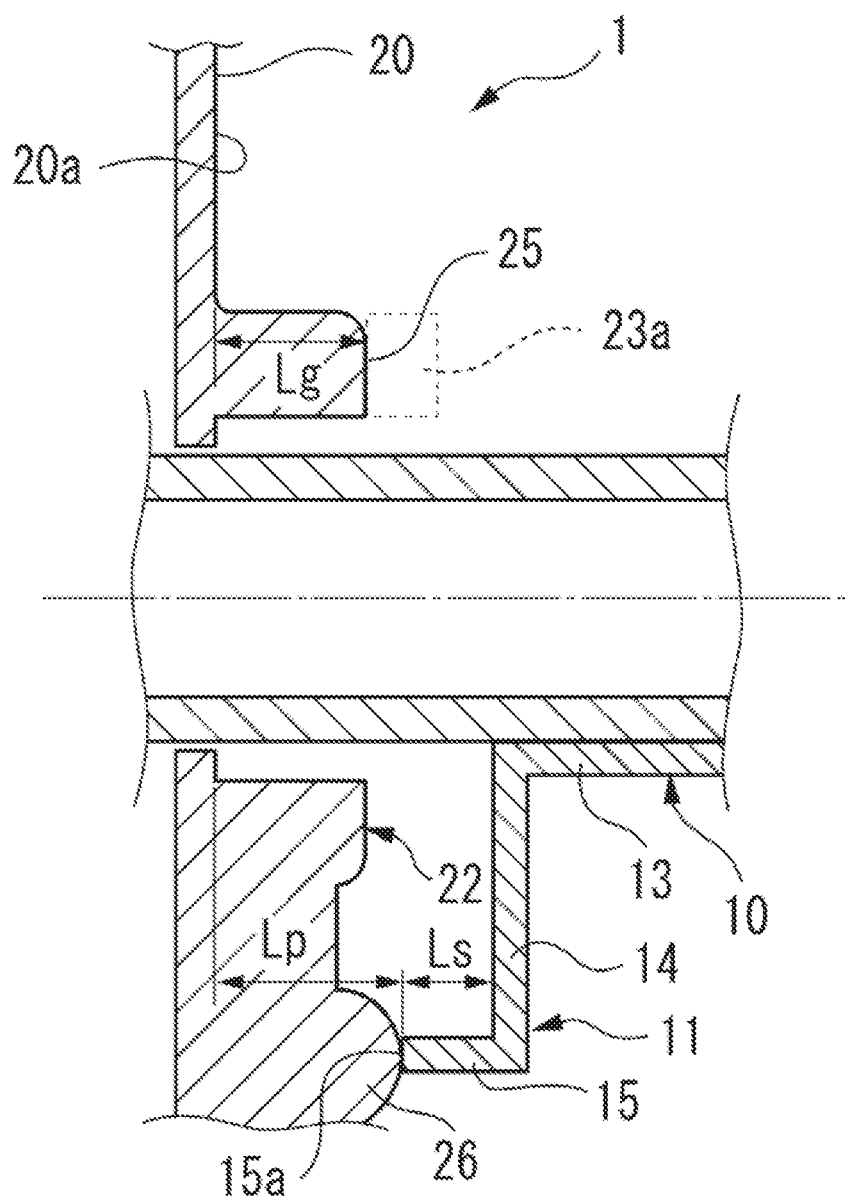
FIG. 6B is a cross sectional view taken along line B-B of FIG. 6A.

As illustrated in FIGS. 6A and 6B, in a state where the first stay 11 and the second stay 12 are directed reversely (a state of being arranged on the opposite side to the first protrusion portion 23), that is, in a state where stay-side abutting portions 14 greatly deviate from the first case-side abutting portion 24 and the second case-side abutting portion 25 in phase such that the stay-side abutting portions 14 of the first stay 11 and the second stay 12 do not interfere with the protrusion parts 23b and 23c, when the pipe 10 is inserted into the pipe insertion hole 21, Lg−Lp<Ls is established. Therefore, since the tip end 15a of the stay claw portion 15 of each of the first stay 11 and the second stay 12 does not interfere with the second protrusion portion 26, the pipe 10 cannot be inserted until reaching the correct position and it is possible to detect the erroneous insertion.

Second Embodiment

Hereinafter, constitutional elements common to the first embodiment are given with same reference numerals as the first embodiment and descriptions thereof will be apparently omitted.

A pipe erroneous assembly preventing structure 2 according to a second embodiment includes the pipe 30 and a case 20.

Figure 7:
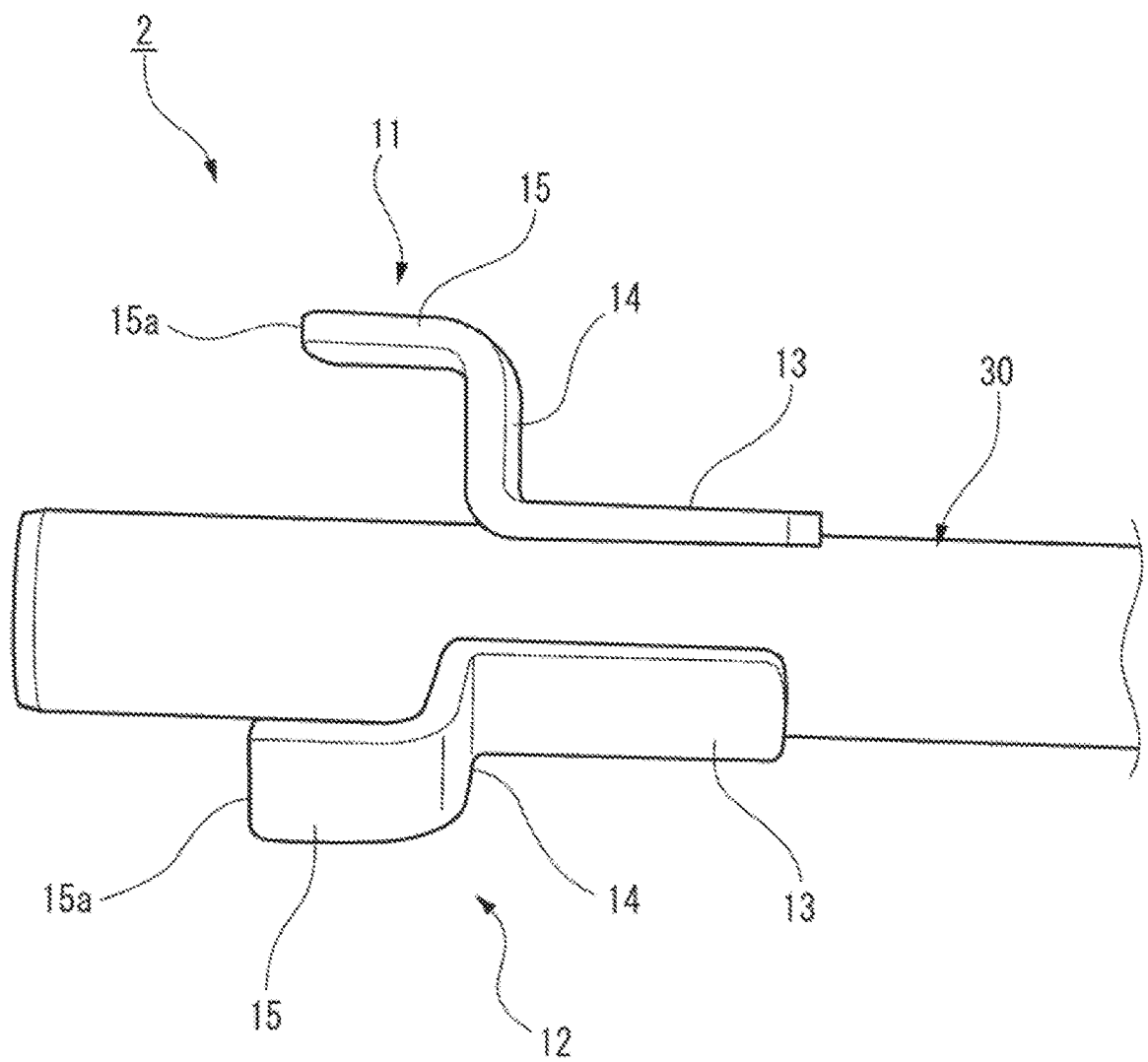
FIG. 7 is a perspective view illustrating a pipe in a pipe erroneous assembly preventing structure according to a second embodiment.
Figure 8:
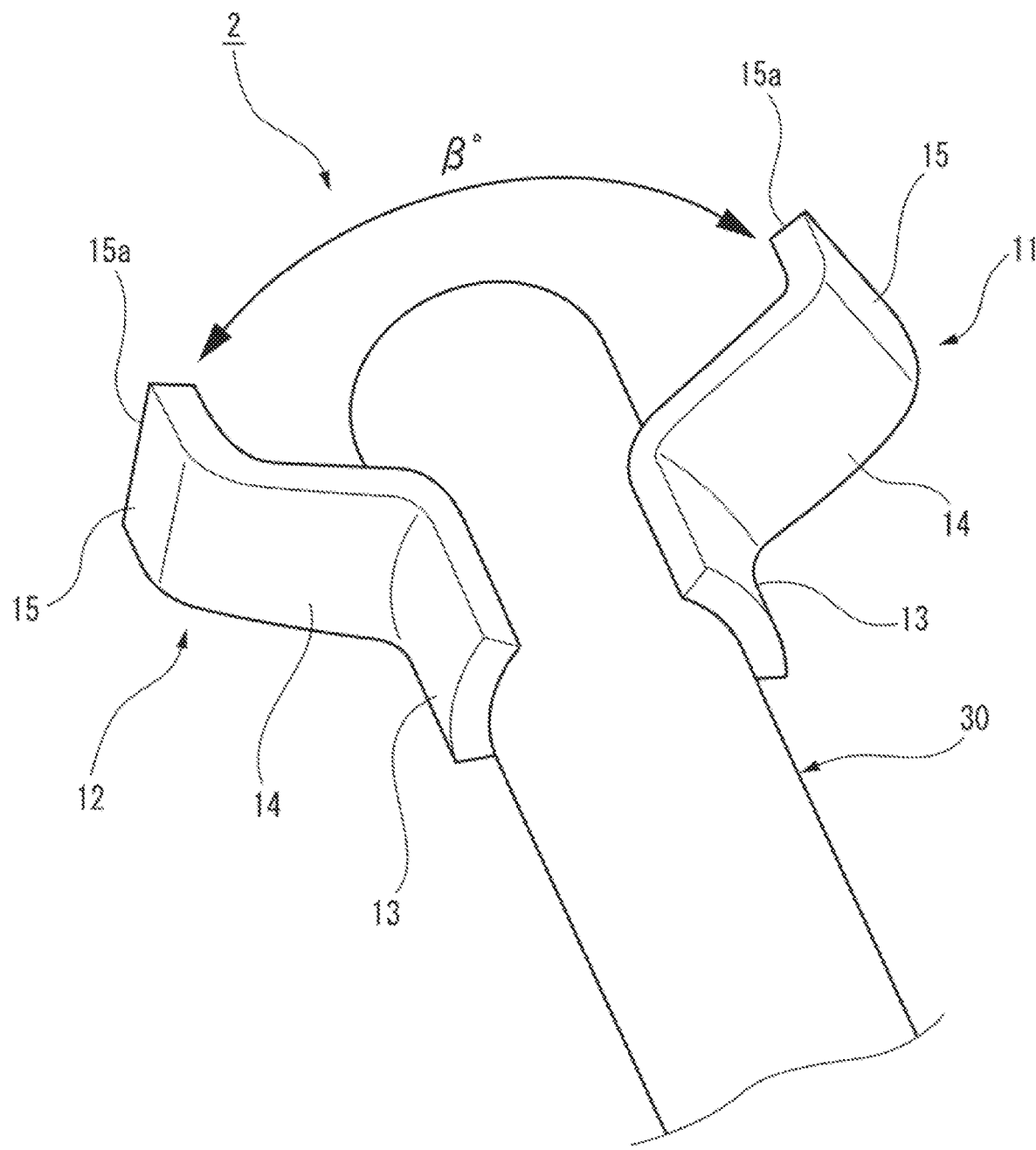
FIG. 8 is a perspective view illustrating a main portion of the pipe illustrated in FIG. 7.

As illustrated in FIGS. 7 and 8, the pipe 30 is provided at the tip end portion thereof with a first stay 11 and a second stay 12 which have the same shape and the same dimension. The angle between the first stay 11 and the second stay 12 is β (for example, 120°). Other configurations of the pipe 30 are the same as those of the pipe 10 in the first embodiment.

Figure 9:
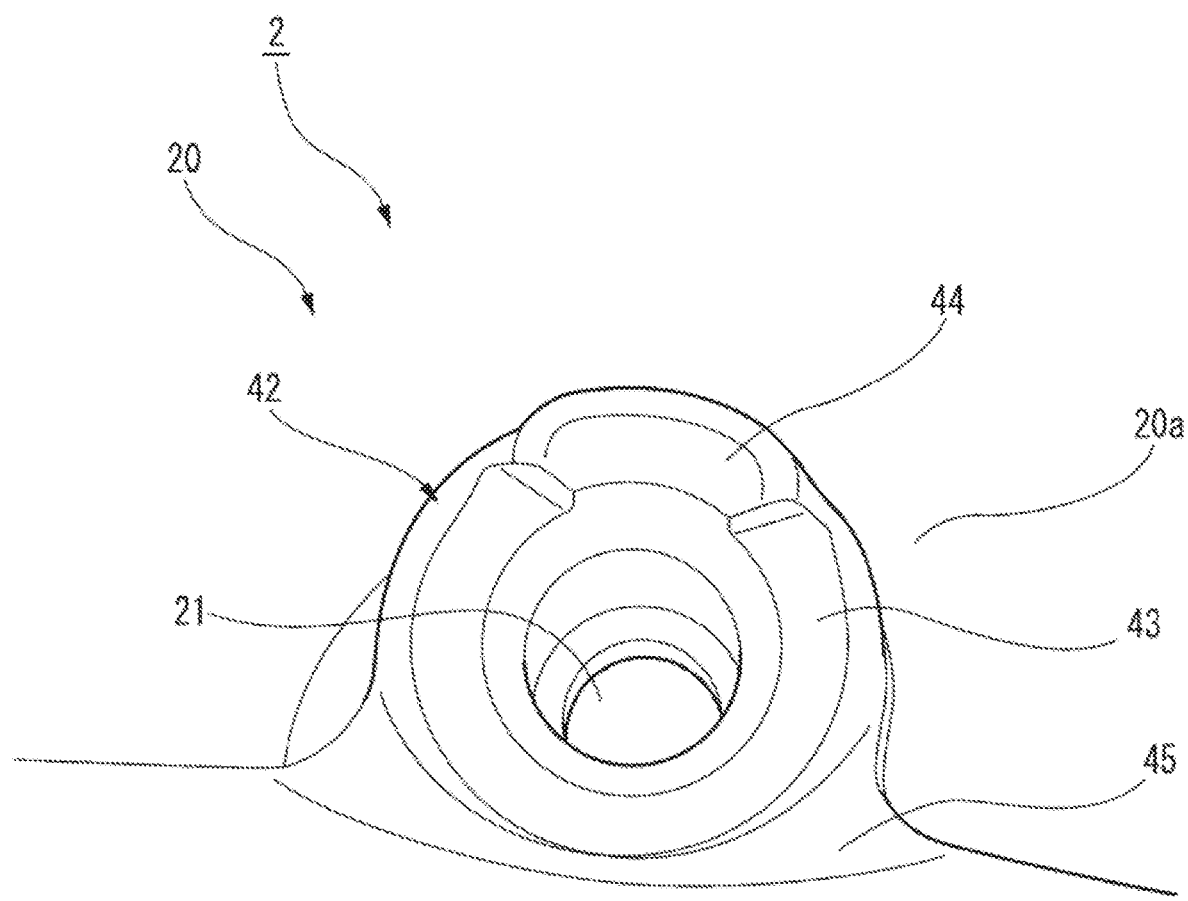
FIG. 9 is a perspective view illustrating a main portion of a case in the pipe erroneous assembly preventing structure of the second embodiment.

As illustrated in FIG. 9, the case 20 is provided with a pipe insertion hole 21 into which the pipe 30 is inserted and a boss portion 42 surrounding the peripheral of the pipe insertion hole 21. In other words, in the case 20, the pipe insertion hole 21 is provided in the boss portion 42.

The boss portion 42 is an annular protrusion portion protruding from a case wall surface 20a. The boss portion 42 is provided with a case-side abutting portion 43 and a third substantially fan-shaped protrusion portion 44 further protruding from the boss portion 42. The case-side abutting portion 43 is a portion to which stay-side abutting portions 14 of the first stay 11 and the second stay 12 abut. The third protrusion portion 44 is a portion to be interposed between the first stay 11 and the second stay 12.

A fourth protrusion portion 45 is provided in the vicinity of the boss portion 42. The fourth protrusion portion 45 protrudes from the case wall surface 20a. The fourth protrusion portion 45 is provided at a position different from that of the case-side abutting portion 43 in a circumferential direction of the pipe insertion hole 21. In this embodiment, the fourth protrusion portion 45 is provided to surround the boss portion 42 on the opposite side to the third protrusion portion 44 with the pipe insertion hole 21 interposed therebetween.

In the second embodiment, in the pipe 30 and the case 20 configured as described above, the length of the stay claw portion 15 in an insertion direction is set to Ls, the distance from the case wall surface 20a to the case-side abutting portion 43 is set to Lg, and the distance from the case wall surface 20a to the fourth protrusion portion 45 is set to Lp. In this state, the dimension of each part is selected to satisfy Lg−Lp<Ls≤Lg. Lg−Lp may have a zero or negative value (0 or less).

Figure 10A:
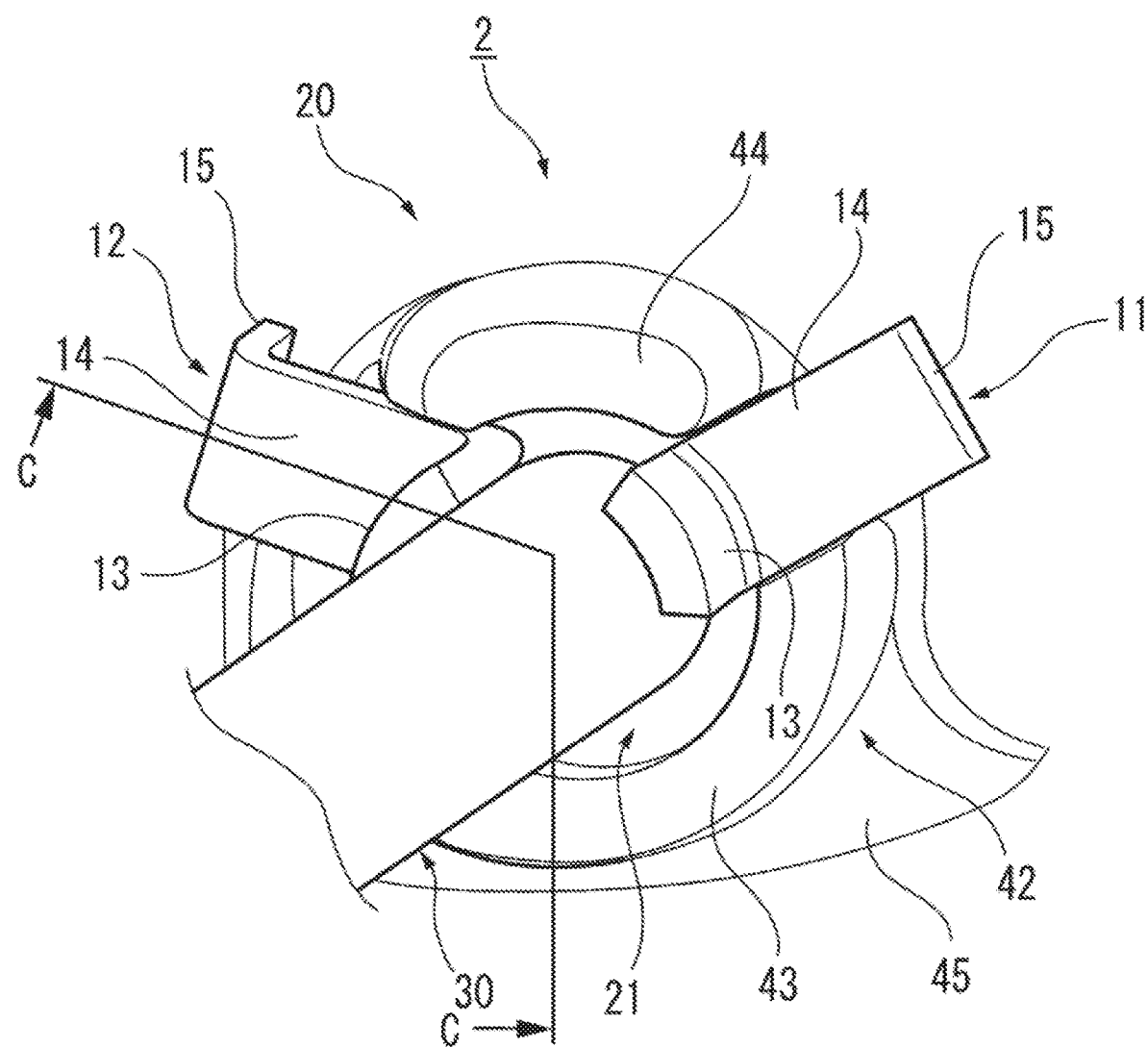
FIG. 10A is a perspective view illustrating a main portion of the pipe erroneous assembly preventing structure of the second embodiment in a state where the pipe is correctly inserted.
Figure 10B:
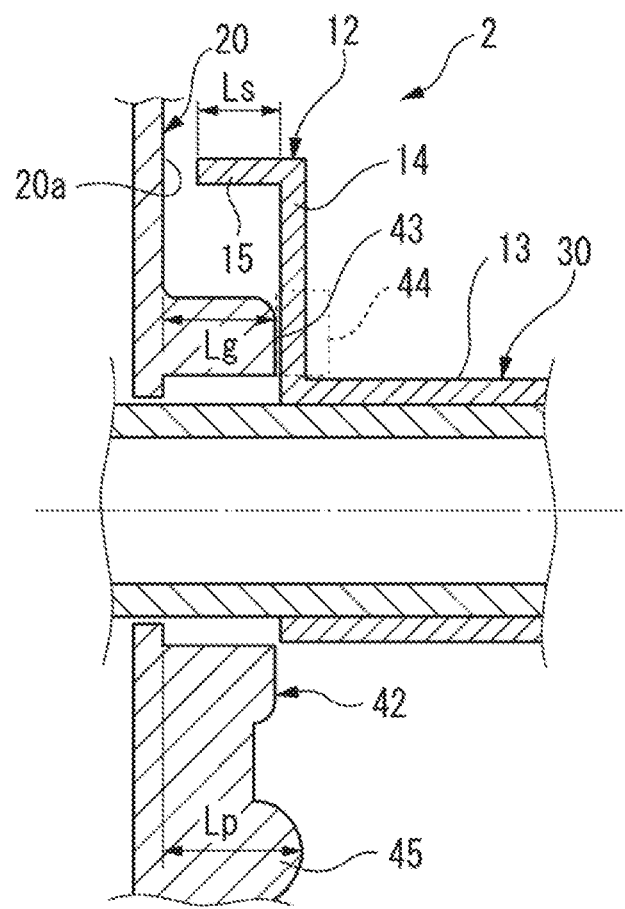
FIG. 10B is a cross sectional view taken along line C-C of FIG. 10A.

According to the second embodiment, as illustrated in FIGS. 10A and 10B, when the pipe 30 is correctly inserted into the pipe insertion hole 21 of the case 20, Ls≤Lg is established. Therefore, since a tip end 15a of the stay claw portion 15 of each of the first stay 11 and the second stay 12 does not interfere with the case wall surface 20a, the stay-side abutting portion 14 of each of the first stay 11 and the second stay 12 abuts to the case-side abutting portion 43, and the third protrusion portion 44 is interposed between the first stay 11 and the second stay 12. Accordingly, the pipe 30 is correctly assembled to the case 20.

Figure 11:
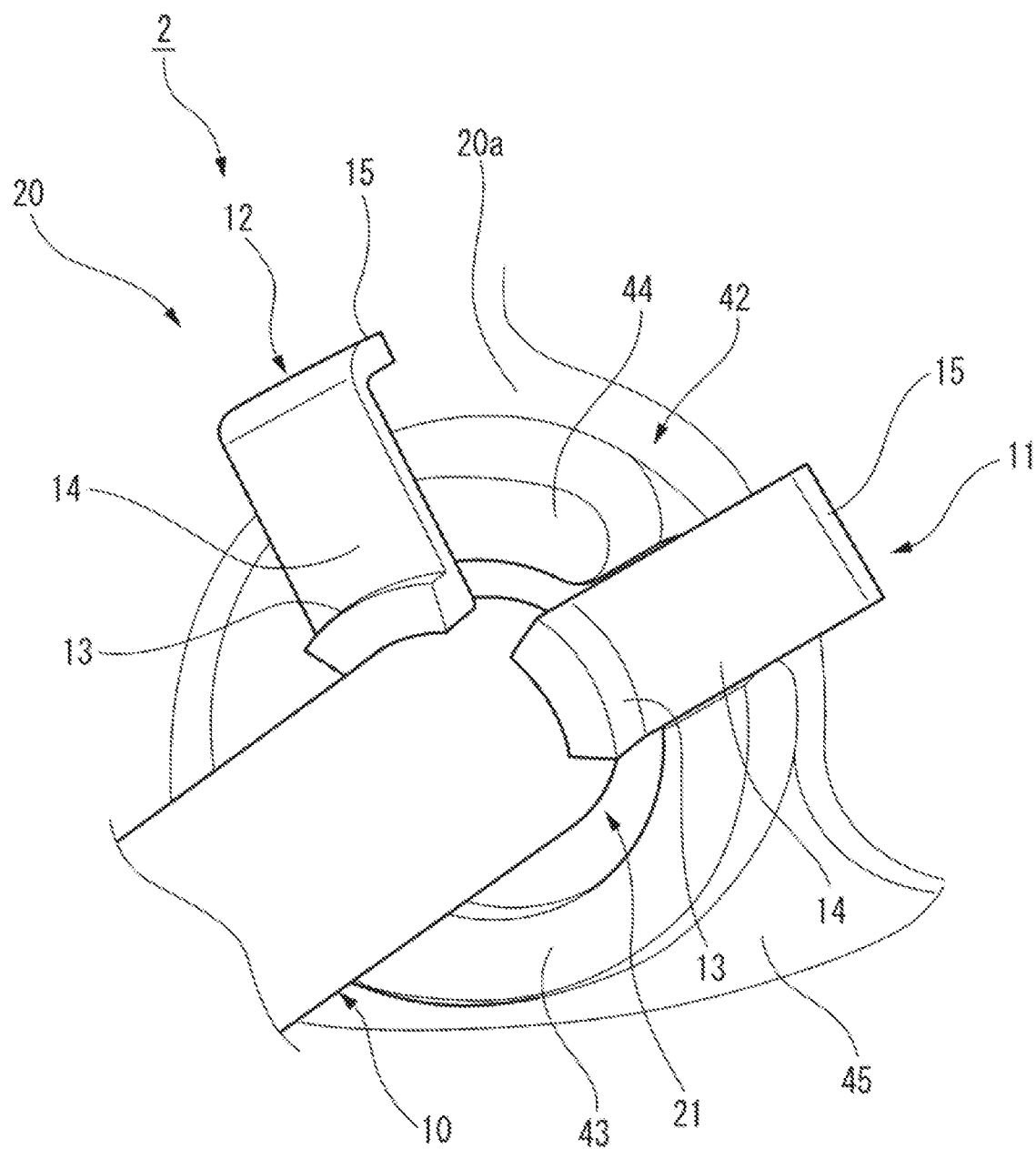
FIG. 11 is a perspective view illustrating a main portion of the pipe erroneous assembly preventing structure of the second embodiment in a state of being erroneously assembled with another pipe.

On the other hand, as illustrated in FIG. 11 in a case where a pipe (for example, the pipe 10 of the first embodiment) in which the angle between the first stay 11 and the second stay 12 is smaller than that of the pipe 30 in the second embodiment is inserted into the pipe insertion hole 21, since the stay-side abutting portion 14 of at least one of the first stay 11 and the second stay 23 (the second stay 12 in the illustrated example) interferes with the third protrusion portion 44 of the case 20, the pipe 10 cannot be inserted until reaching the correct position and it is possible to detect the erroneous insertion.

Figure 12A:
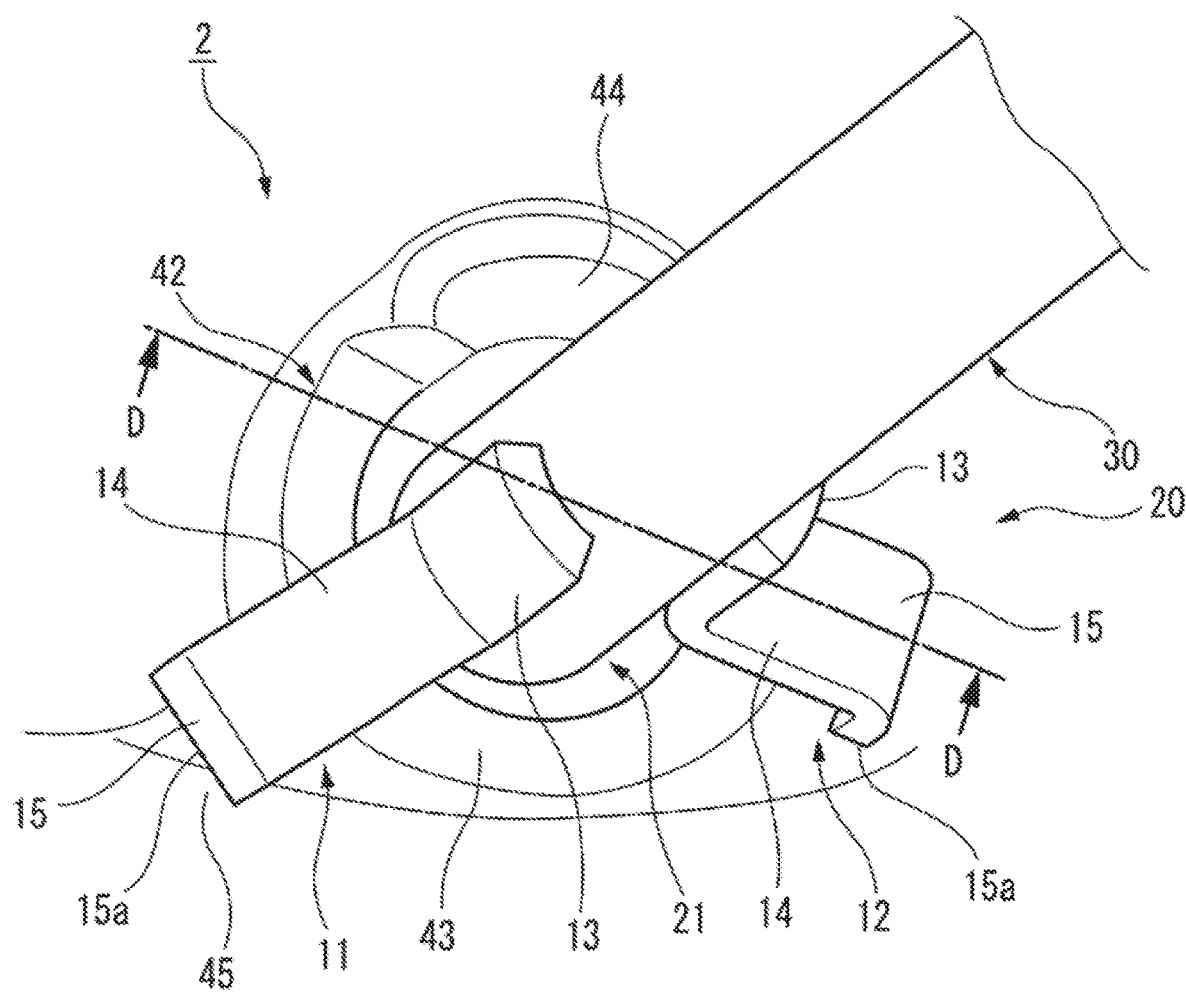
FIG. 12A is a perspective view illustrating a main portion of the pipe erroneous assembly preventing structure of the second embodiment in a state where the pipe is erroneously assembled thereto with a wrong angle.
Figure 12B:
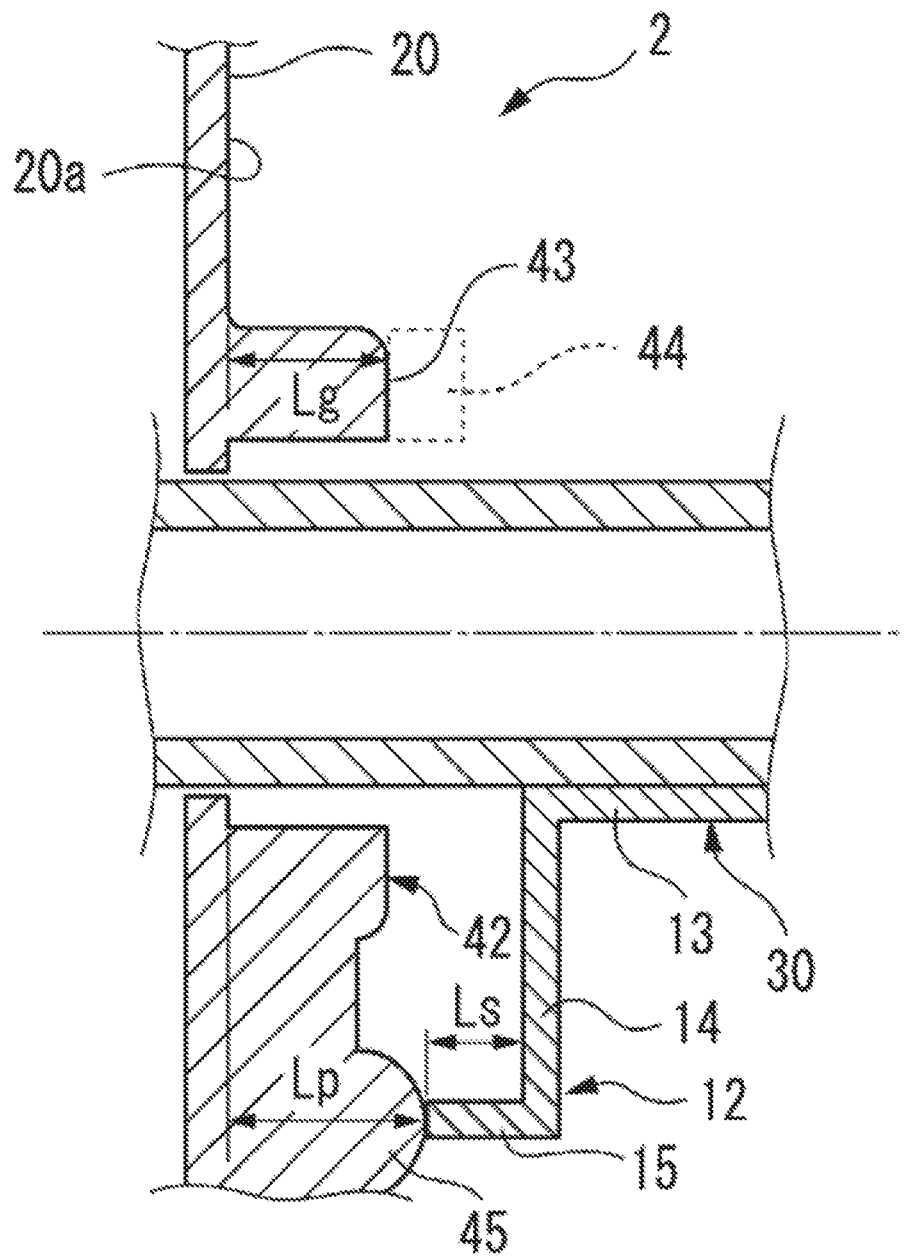
FIG. 12B is a cross sectional view taken along line D-D of FIG. 12A.

As illustrated in FIGS. 12A and 12B, in a state where the first stay 11 and the second stay 12 are directed reversely (a state of being arranged on the opposite side to the third protrusion portion 44), when the pipe 30 is inserted into the pipe insertion hole 21, Lg−Lp<Ls is established. Therefore, since the tip end 15a of the stay claw portion 15 of each of the first stay 11 and the second stay 12 does not interfere with the fourth protrusion portion 45, the pipe 30 cannot be inserted until reaching the correct position and it is possible to detect the erroneous insertion.

The embodiments described above can be apparently modified, improved, or the like.

For example, in the above-described embodiment, the pipe 10 (30) is provided with two stays (the first stay 11 and the second stay 12), but in a pipe erroneous assembly preventing structure including only one pipe, the pipe may be provided at least one stay. In addition, in a pipe erroneous assembly preventing structure including two pipes or more, the pipe may be provided at least two stays.

Figure 13:
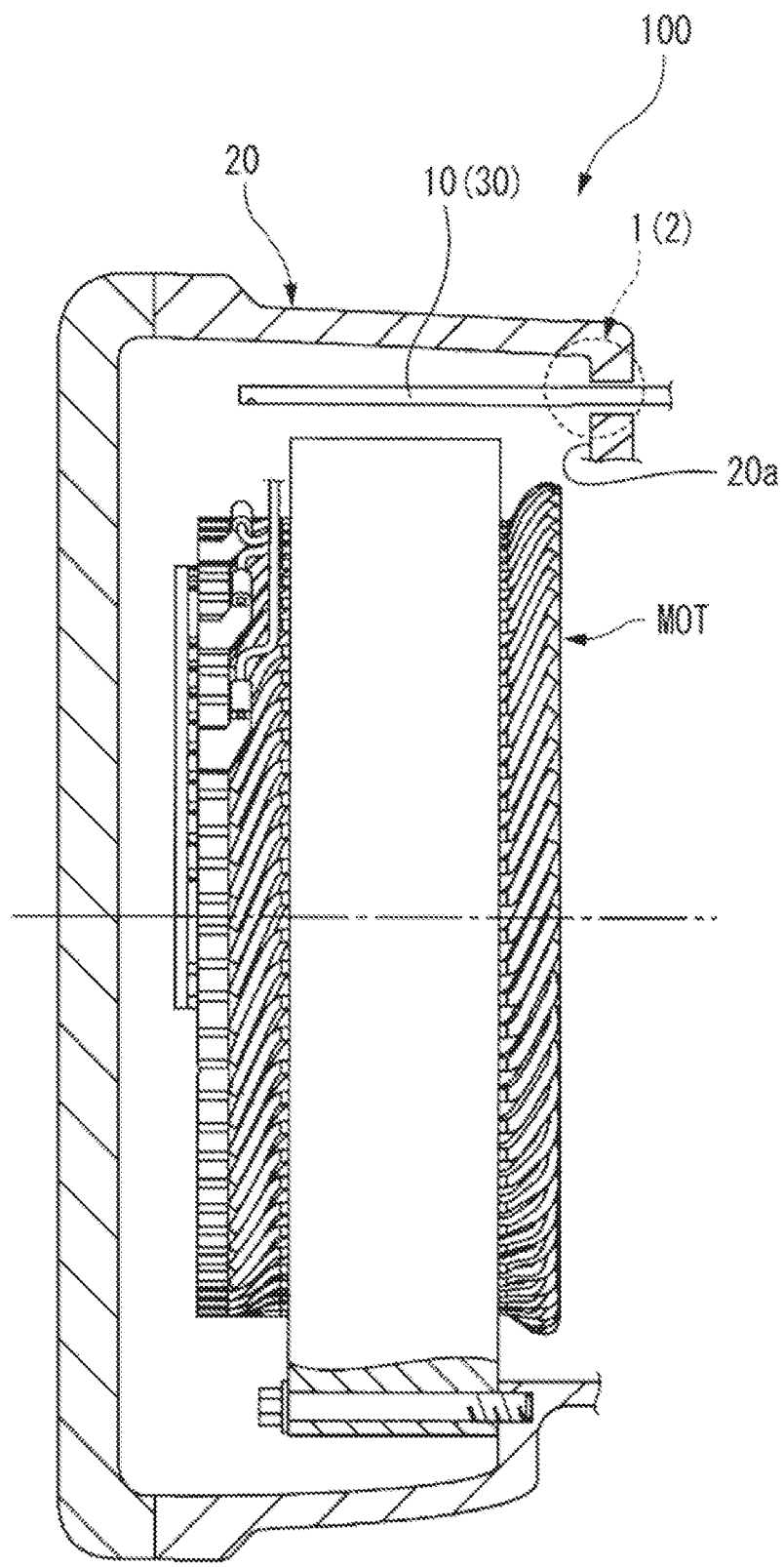
FIG. 13 is a cross sectional view illustrating an electric rotary machine applicable with the pipe erroneous assembly preventing structures of the first and second embodiments.

The pipe erroneous assembly preventing structure 1 (2) of the above-described embodiment can be applied to an erroneous assembly preventing structure including a pipe 10 (30) which drops a coolant to an electric motor MOT and a case 20 in an electric rotary machine 100 illustrated in FIG. 13, for example.

At least the following items are described in this specification. In the parentheses, the corresponding constitutional elements and the like in the above-described embodiment are described, but the invention is not limited thereto.

(1) A pipe erroneous assembly preventing structure (a pipe erroneous assembly preventing structure 1) including:
  a pipe (a pipe 10); and
  a case (a case 20) provided with a pipe insertion hole (a pipe insertion hole 21) into which the pipe is inserted on a case wall surface (a case wall surface 20a) thereof, wherein
  the pipe is provided with a stay (a first stay 11, a second stay 12) in which a stay-side abutting portion (a stay-side abutting portion 14) extending in a direction orthogonal to an axial center of the pipe and a stay claw portion (a stay claw portion 15) extending from the stay-side abutting portion along an insertion direction intersect with each other in an L shape,
  the case is provided with:
    a hole forming portion (a boss portion 22) surrounding a peripheral of the pipe insertion hole;
    a first protrusion portion (a first protrusion portion 23) provided in the hole forming portion;
    a case-side abutting portion (a first case-side abutting portion 24, a second case-side abutting portion 25) which is recessed in the first protrusion portion and to which the stay-side abutting portion of the stay abuts; and
    a second protrusion portion (a second protrusion portion 26) protruding from the case wall surface and provided on an outside of the hole forming portion at a position different from the case-side abutting portion in a circumferential direction, and
  in a case where a length of the stay claw portion in the insertion direction is set to Ls, a distance from the case wall surface to the case-side abutting portion is set to Lg, and a distance from the case wall surface to the second protrusion portion is set to Lp, Lg−Lp<Ls≤Lg is satisfied.

According to (1), since Ls≤Lg is established, when the pipe is correctly inserted into the pipe insertion hole of the case, the stay-side abutting portion abuts to the case-side abutting portion without the tip end of the stay claw portion interfering with the case wall surface. Accordingly, the pipe is assembled to the case correctly. On the other hand, when the phases of the stay-side abutting portion and the case-side abutting portion deviate from each other, since the stay-side abutting portion interferes with the first protrusion portion of the case, it is possible to detect the erroneous insertion. When the stay-side abutting portion greatly deviates from the case-side abutting portion in phase such that the stay-side abutting portion does not interfere with the first protrusion portion, Lg−Lp<Ls is established. Accordingly, since the tip end of the stay claw portion interferes with the second protrusion portion, it is possible to detect the erroneous insertion, and it is possible to properly prevent the erroneous assembly between the case and the pipe.

(2) The pipe erroneous assembly preventing structure according to (1), wherein the pipe is provided with at least two stays, and at least two case-side abutting portions are recessed in the first protrusion portion.

According to (2), it is possible to prevent the erroneous assembly between the case and plural pipes by changing the angle between the stays of the pipe.

(3) A pipe erroneous assembly preventing structure (a pipe erroneous assembly preventing structure 2) including:

a pipe (a pipe 30); and a case (a case 20) provided with a pipe insertion hole into which the pipe is inserted on a case wall surface thereof, wherein the pipe is provided with at least two stays (a first stay 11, a second stay 12) in each one of which a stay-side abutting portion (stay-side abutting portions 14) extending in a direction orthogonal to an axial center of the pipe and a stay claw portion (stay claw portions 15) extending from the stay-side abutting portion along an insertion direction intersect with each other in an L shape, the case is provided with:

a hole forming portion (a boss portion 42) protruding from the case wall surface to surround a peripheral of the pipe insertion hole;

a case-side abutting portion (a case-side abutting portion 43) which is provided in the hole forming portion and to which stay-side abutting portions of the at least two stays abut:

a third protrusion portion (a third protrusion portion 44) provided in the hole forming portion and interposed between the at least two stays; and a fourth protrusion portion (a fourth protrusion portion 45) protruding from the case wall surface and provided on an outside of the hole forming portion at a position different from the case-side abutting portion in a circumferential direction, and in a case where a length of the stay claw portion in the insertion direction is set to Ls, a distance from the case wall surface to the case-side abutting portion is set to Lg, and a distance from the case wall surface to the fourth protrusion portion is set to Lp, Lg−Lp<Ls≤Lg is satisfied.

According to (3), Ls≤Lg is established. Accordingly, when the pipe is correctly inserted into the pipe insertion hole of the case, since the tip end of the stay claw portion of the stay does not interfere with the case wall surface, the stay-side abutting portion abuts to the case-side abutting portion. As a result, the pipe is correctly assembled to the case. On the other hand, when a pipe in which the angle between stays is small is inserted into the pipe insertion hole, since the stay-side abutting portion interferes with the third protrusion portion of the case, it is possible to detect the erroneous insertion. In addition, when the pipe is inserted into the pipe insertion hole with the stay directed reversely, Lg−Lp<Ls is established. Accordingly, since the tip end of the stay claw portion interferes with the fourth protrusion portion, it is possible to detect the erroneous insertion, and it is possible to properly prevent the erroneous assembly between the case and the pipe.

The invention claimed is:

1. A pipe erroneous assembly preventing structure comprising:

a pipe; and a case including a case wall surface provided with a pipe insertion hole into which the pipe is inserted, wherein the pipe is provided with a stay in which a stay-side abutting portion extending in a direction orthogonal to an axial center of the pipe and a stay claw portion extending from the stay-side abutting portion along an insertion direction intersect with each other in an L shape, the case is provided with:

a hole forming portion surrounding a peripheral of the pipe insertion hole;

a first protrusion portion protruding from the hole forming portion;

a case-side abutting portion which is recessed in the first protrusion portion and to which the stay-side abutting portion of the stay abuts; and a second protrusion portion protruding from the case wall surface and provided on an outside of the hole forming portion at a position different from the case-side abutting portion in a circumferential direction, and in a case where a length of the stay claw portion in the insertion direction is set to Ls, a distance from the case wall surface to the case-side abutting portion is set to Lg, and a distance from the case wall surface to the second protrusion portion is set to Lp, Lg−Lp<Ls≤Lg is satisfied.

2. The pipe erroneous assembly preventing structure according to claim 1, wherein the pipe is provided with at least two stays, and at least two case-side abutting portions are recessed in the first protrusion portion.

3. A pipe erroneous assembly preventing structure comprising:

a pipe; and a case including a case wall surface provided with a pipe insertion hole into which the pipe is inserted, wherein the pipe is provided with at least two stays in each one of which a stay-side abutting portion extending in a direction orthogonal to an axial center of the pipe and a stay claw portion extending from the stay-side abutting portion along an insertion direction intersect with each other in an L shape, the case is provided with:

a hole forming portion protruding from the case wall surface to surround a peripheral of the pipe insertion hole;

a case-side abutting portion which is provided in the hole forming portion and to which stay-side abutting portions of the at least two stays abut;

a third protrusion portion protruding from the hole forming portion and interposed between the at least two stays; and a fourth protrusion portion protruding from the case wall surface and provided on an outside of the hole forming portion at a position different from the case-side abutting portion in a circumferential direction, and in a case where a length of the stay claw portion in the insertion direction is set to Ls, a distance from the case wall surface to the case-side abutting portion is set to Lg, and a distance from the case wall surface to the fourth protrusion portion is set to Lp, Lg−Lp<Ls≤Lg is satisfied.

* * * * *